No. 850,275. PATENTED APR. 16, 1907.
G. B. STAPLES.
TILING.
APPLICATION FILED OCT. 27, 1906.
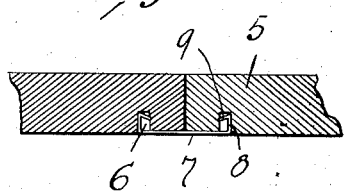
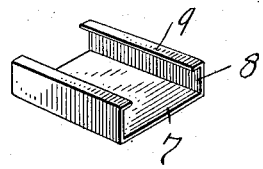
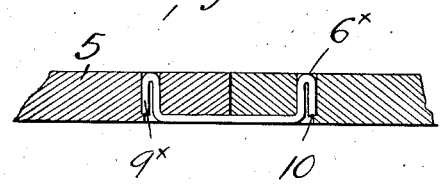
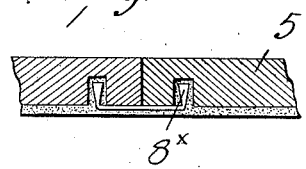
Attest:
O. S. Middleton
Edward N. Sarton
Inventor
George B. Staples
by Spear, Middleton, Donaldson & Spear
Attys.

UNITED STATES PATENT OFFICE.

GEORGE B. STAPLES, OF PHILADELPHIA, PENNSYLVANIA.

TILING.

No. 850,275.

Specification of Letters Patent.

Patented April 16, 1907.

Application filed October 27, 1906. Serial No. 340,916.

*To all whom it may concern:*

Be it known that I, GEORGE B. STAPLES, a citizen of the United States, residing at Philadelphia, Pennsylvania, have invented certain new and useful Improvements in Tiling, of which the following is a specification.

My present invention is an improvement over that disclosed in my application for Letters Patent of the United States filed by me November 28, 1905, Serial No. 289,517.

In carrying out my invention I design to provide means whereby the tiles may be securely locked together. In this connection I employ clips having upwardly-extending prongs or projections adapted to be locked within recesses or openings on the under side of the tiles.

The invention is shown in the accompanying drawings, in which—

Figure 1 shows in section two tiles with one form of clip. Fig. 2 is a similar view with another form of clip. Figs. 3, 4, and 5 are views of different forms of clips used in carrying out my invention.

In the drawings the tiles 5 are of any ordinary shape and are composed of rubber or composition material having the required qualities or resilience to form a comfortable floor-covering. They are recessed at 6 or are provided with openings extending through from top to bottom, as shown at $6^\times$ in Fig. 2.

In Figs. 1 and 3 I show a form of clip consisting of sheet metal 7, with upwardly-projecting prongs 8, the upper ends of which are turned over at 9 to form flanges adapted to engage with the walls of the recesses to thereby lock the clip in place and lock the tiles together. This clip has a certain amount of resilience, so that while the flanges or turned-over ends 9 are substantially at right angles to the projections 8 before the clip is used said clip will spring downwardly, as shown in Fig. 1, when the clip is forced into place in the recess of the tile, so that the edge of the flange will lock or slightly embed itself into connection with the wall of the recess, and thereby lock the clip in place. Further, the main body of the clip is also slightly resilient, and the parts are so related that the ends or projections of the clip are adapted to spring outwardly from each other when they are inserted in the recesses, and the tendency of these projections to resume their normal upward position will act to draw the tiles close together.

In laying the floor the tile is provided with these clips, and they are held tightly therein by contact with the walls of the recess, leaving the other ends of the clips projecting to receive the other tile.

In Figs. 2 and 6 the clip consists of a bar of metal having upwardly-extending projections and turned-over ends $9^\times$. These are turned to a greater extent than the ends of the clip first described, so that the turned-over portions extend vertically alongside of the upwardly-extending projections, forming shoulders at 10, adapted to embed themselves in the material of the tile. This clip is also resilient and its turned-over ends lock with the wall of the recess with a resilient force. In this modification the projections, with their turned-over ends, extend to the upper surface of the tile and may form wearing-surfaces.

In Fig. 4 I show a form of clip in which the projection is of dovetailed form, as shown at $8^\times$. This is adapted to pass up into the recess of the tile.

In all of the above forms I may employ cement to fill the recess of the tile, which, engaging the projection of the clip or turned-over portion thereof, will securely lock the clip to the tile. In addition to this I lay the clips in a bed of cement so as to prevent it from laying hard on the floor and to secure a uniform level of the tiles and the clips irrespective of any unevenness of the floor upon which the tiles are laid. In carrying out this part of my invention the clip may be of any of the forms above described, or it may be a clip having points, as shown in Fig. 5, driven up into the tile without a previously-formed recess.

It will be seen from Figs. 1, 2, 3, and 4 that a clip is provided having a turned-over portion presenting an edge or shoulder adapted to embed itself in the material of the tile, or such a shoulder as will permit the material of the tile to expand beneath it, and thus lock the clip in place.

I do not limit myself to the precise forms of clip shown.

I claim as my invention—

1. In combination, with tiles having recesses, a clip having upwardly-extending projections with the ends thereof turned over from one side of the recess to the other presenting edges to lock with the material of the tile, substantially as described.

2. In combination with tiles, a clip having projections entering recesses in the tiles and having the upper ends of the said projections turned over from one side of the recess to the other and downwardly to lock with the wall of the recess presenting a gripping edge to engage the material of the tile, substantially as described.

3. In combination with tiles having recesses, a clip having upwardly-extending projections and upper ends turned over at right angles reaching from one side of the recesses to the other.

4. In combination, tiles having recesses and a clip having upwardly-extending projections with upper ends turned over from one side of the recesses to the other and downwardly alongside the main portion of the projection, substantially as described.

5. In combination, tiles having recesses extending through from the bottom to the top of the tiles and a clip having upwardly-extending projections entering the said recesses at the bottom and exposed at the upper ends thereof, substantially as described.

In testimony whereof I affix my signature in presence of two witnesses.

GEORGE B. STAPLES.

Witnesses:
FREDERICK J. GEIGER,
EDWARD BROOKS, Jr.